United States Patent
Kurihara

(10) Patent No.: US 8,953,100 B2
(45) Date of Patent: Feb. 10, 2015

(54) INFORMATION PROCESSING APPARATUS AND AUDIO OUTPUT CONTROL METHOD OF AN INFORMATION PROCESSING APPARATUS

(71) Applicant: Kabushiki Kaisha Toshiba, Tokyo (JP)

(72) Inventor: Nobuyuki Kurihara, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/683,541

(22) Filed: Nov. 21, 2012

(65) Prior Publication Data

US 2013/0076991 A1    Mar. 28, 2013

Related U.S. Application Data

(63) Continuation of application No. 13/015,338, filed on Jan. 27, 2011, now abandoned.

(30) Foreign Application Priority Data

Jan. 29, 2010  (JP) ................. 2010-019542

(51) Int. Cl.
*H04N 5/60* (2006.01)
(52) U.S. Cl.
CPC ................... *H04N 5/60* (2013.01)
USPC ......................................................... 348/738
(58) Field of Classification Search
USPC .......... 348/738, 564, 565, 569, 552, 553, 725
See application file for complete search history.

(56) References Cited

U.S. PATENT DOCUMENTS

| 5,237,418 | A | 8/1993 | Kaneko |
| 5,548,340 | A | 8/1996 | Bertram |
| 6,664,970 | B1 | 12/2003 | Matsushita |
| 7,423,660 | B2 | 9/2008 | Ouchi et al. |
| 7,563,974 | B2 * | 7/2009 | Ozaki et al. ................ 84/615 |

(Continued)

FOREIGN PATENT DOCUMENTS

| JP | S64-033619 | 2/1989 |
| JP | H09-258705 | 10/1997 |

(Continued)

OTHER PUBLICATIONS

Office Action received in Japanese Patent Application No. 2011-129476, mailed on Jan. 15, 2013.

*Primary Examiner* — Paulos M Natnael
(74) *Attorney, Agent, or Firm* — Knobbe Martens Olson & Bear LLP

(57) ABSTRACT

According to one embodiment, an information processing apparatus includes a display, a speaker, a connector, a multi-display module, an audio driver, and an audio-output controller. The connector is configured to output a video signal and an audio signal. The multi-display module is configured to control an outputting of the video signal in order to display a part of an image on the display and another part of the image at an external apparatus connected to the connector. The audio driver is configured to control an outputting of the audio signal at the speaker and the connector. The audio-output controller is configured to control the audio driver to output the audio signal to the speaker or the connector in accordance with the state of displaying the image at the display or the external apparatus, if the multi-display module displays the parts of the image on the display and the external apparatus.

15 Claims, 4 Drawing Sheets

(56) References Cited

U.S. PATENT DOCUMENTS

| | | |
|---|---|---|
| 7,773,154 B2 * | 8/2010 | Seki .............................. 348/552 |
| 7,894,854 B2 * | 2/2011 | Lee ............................ 455/556.1 |
| 7,975,051 B2 | 7/2011 | Saint Clair et al. |
| 8,090,405 B2 | 1/2012 | Lee |
| 2002/0019881 A1 * | 2/2002 | Bokhari et al. ............... 709/246 |
| 2003/0020763 A1 * | 1/2003 | Mayer et al. .................. 345/838 |
| 2004/0103119 A1 | 5/2004 | Fukui |
| 2006/0089735 A1 * | 4/2006 | Atkinson ......................... 700/94 |
| 2007/0165038 A1 * | 7/2007 | Chiba et al. ................... 345/520 |
| 2007/0180978 A1 | 8/2007 | Ozaki et al. |
| 2007/0296818 A1 * | 12/2007 | Porwal .......................... 348/163 |
| 2009/0040380 A1 | 2/2009 | Fukui |
| 2009/0040381 A1 * | 2/2009 | Fukui ............................ 348/554 |
| 2010/0004857 A1 | 1/2010 | Pereira et al. |
| 2010/0205648 A1 * | 8/2010 | Saadat et al. .................. 725/153 |
| 2010/0325409 A1 * | 12/2010 | Kim et al. ......................... 713/2 |
| 2011/0013075 A1 * | 1/2011 | Kim et al. ..................... 348/370 |
| 2011/0124372 A1 * | 5/2011 | Lee ............................ 455/556.1 |
| 2011/0187939 A1 | 8/2011 | Kurihara |
| 2012/0088545 A1 | 4/2012 | Lee |
| 2012/0182479 A1 | 7/2012 | Sato |

FOREIGN PATENT DOCUMENTS

| | | |
|---|---|---|
| JP | 2000-278626 | 10/2000 |
| JP | 2005-101979 | 4/2005 |
| JP | 2005-149322 | 6/2005 |
| JP | 2006186867 | 7/2006 |
| JP | 2006-270425 | 10/2006 |
| JP | 2008-177974 | 7/2008 |
| JP | 2008-182390 | 8/2008 |
| JP | 2009-009321 | 1/2009 |
| JP | 2009-44253 | 2/2009 |
| JP | 2009-153001 | 7/2009 |
| JP | 2009-283997 | 12/2009 |

* cited by examiner

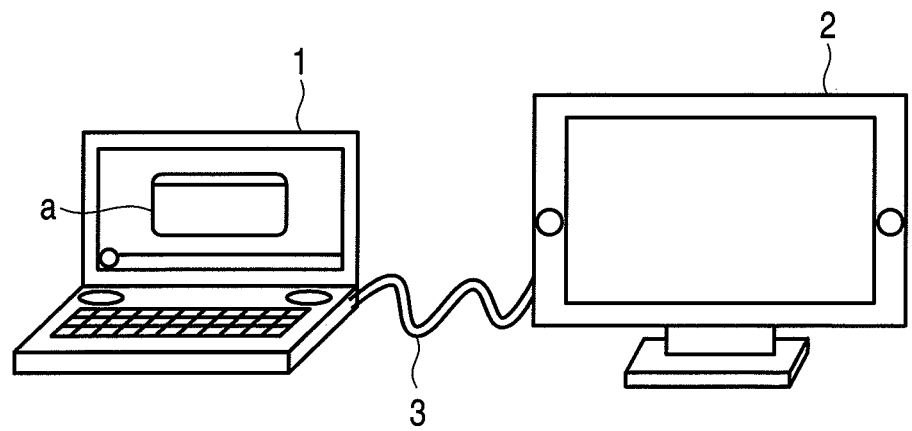
F I G. 1
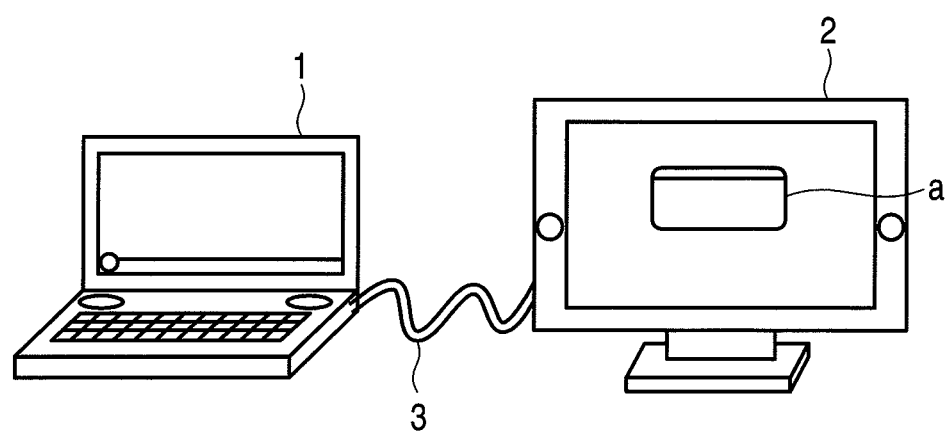
F I G. 2

INFORMATION PROCESSING APPARATUS AND AUDIO OUTPUT CONTROL METHOD OF AN INFORMATION PROCESSING APPARATUS

CROSS-REFERENCE TO RELATED APPLICATIONS

This application is a continuation of U.S. patent application Ser. No. 13/015,338, filed on Jan. 27, 2011, and entitled "INFORMATION PROCESSING APPARATUS AND AUDIO OUTPUT CONTROL METHOD OF AN INFORMATION PROCESSING APPARATUS," which is based upon and claims the benefit of priority from Japanese Patent Application No. 2010-019542, filed Jan. 29, 2010; the entire contents of both of which are incorporated herein by reference.

FIELD

Embodiments described herein relate generally to a technique of controlling audio outputs, which is fit for use in personal computers that can output video signals and audio signals to, for example, television receivers or display apparatuses including a loudspeaker.

BACKGROUND

In recent years, personal computers, each including a High-Definition Multimedia Interface (HDMI) connector, have come into use in increasing numbers. HDMI is an interface standard that enables one cable to transmit both video signals and audio signals. Any user of a notebook personal computer with an HDMI connector can therefore enjoy viewing, on a large screen, any high-definition TV program received through the HDMI connector and played back by the personal computer.

As in this case of connecting a personal computer and a television receiver to each other, a plurality of electronic apparatuses, each including the function of displaying images and the function of outputting audio data, are now connected and used in combination on more and more occasions. Hence, various methods of appropriately setting the apparatuses, to which video signals and audio signals should be output, have hitherto been proposed. (See, for example, Jpn. Pat. Appln. KOKAI Publication No. 2009-44253.)

If a television receiver is connected to, for example, a personal computer, images may be displayed on the screen of only one of these apparatuses, or on the screens of both apparatuses. Two methods of displaying images on both apparatuses are available. One is the clone display method that displays the same image on the screens of both apparatuses at the same time. The other is the multi-display method that displays a part of an image at one apparatus and the other part of the image on the other apparatus. In the multi-display method, one apparatus is primary, and the other is secondary. In the multi-display disclosed in Jpn. Pat. Appln. KOKAI Publication No. 2009-44253, for example, the audio output is controlled, causing the primary apparatus to produce audio.

In the multi-display method, however, the audio data will inevitably output at the primary apparatus, not at the secondary apparatus which the user keeps his or her eyes on, if the secondary apparatus displays the window of a software item (application program) that is important to the user.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 1 is an exemplary diagram showing the first mode of using an information processing apparatus according to an embodiment.

FIG. 2 is an exemplary diagram showing the second mode of using the information processing apparatus according to the embodiment.

DETAILED DESCRIPTION

Figure 3:
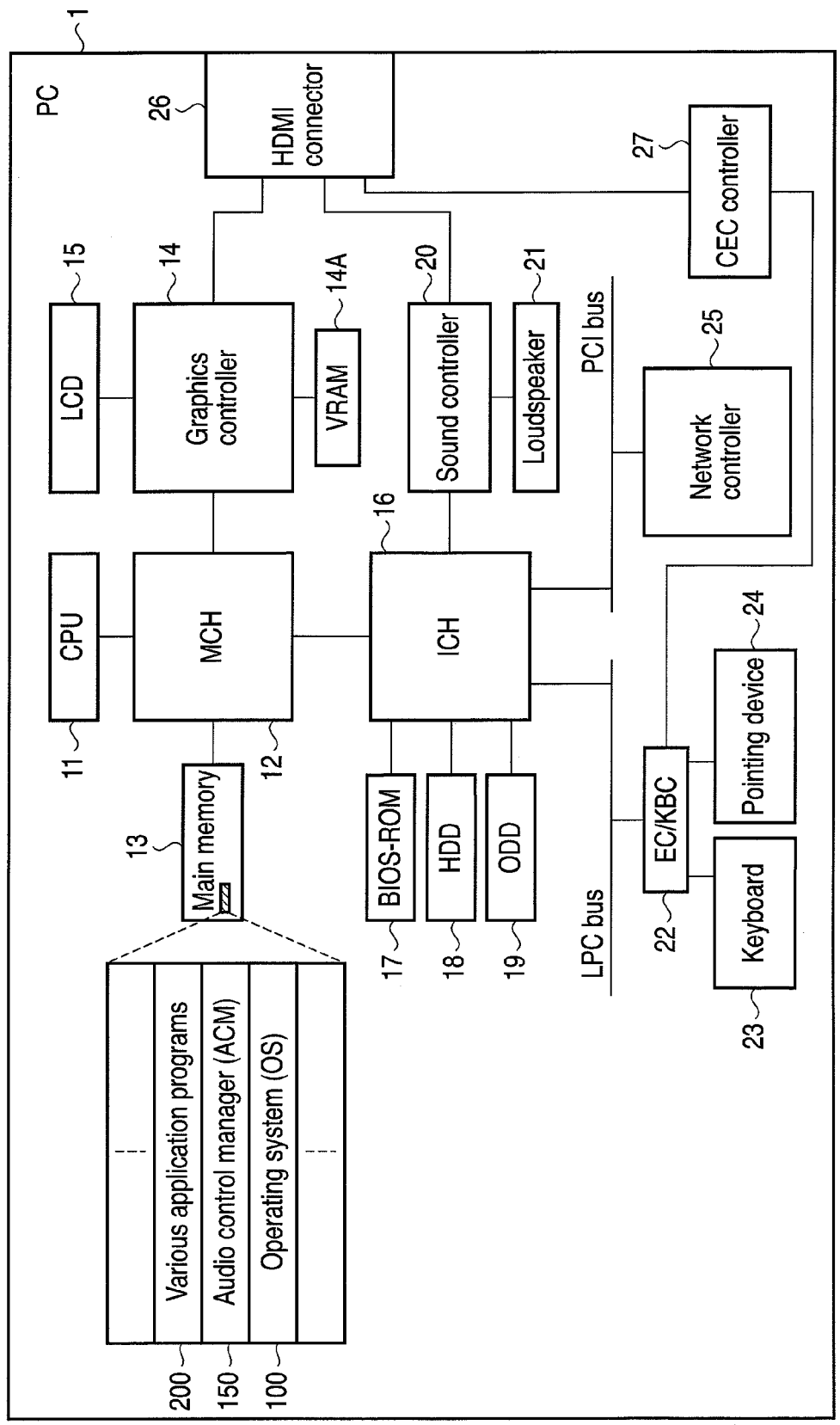
FIG. 3 is an exemplary diagram showing the system configuration of the information processing apparatus according to the embodiment.

Various embodiments will be described hereinafter with reference to the accompanying drawings.

In general, according to one embodiment, an information processing apparatus includes a display, a speaker, a connector, a multi-display module, an audio driver, and an audio-output controller. The connector is configured to output a video signal and an audio signal. The multi-display module is configured to control an outputting of the video signal in order to display a part of an image on the display and another part of the image at an external apparatus connected to the connector. The audio driver is configured to control an outputting of the audio signal at the speaker and the connector. The audio-output controller is configured to control the audio driver to output the audio signal to the speaker or the connector in accordance with the state of displaying the image at the display or the external apparatus, if the multi-display module displays the parts of the image on the display and the external apparatus.

FIG. 1 is an exemplary diagram showing the first mode of using an information processing apparatus according to the embodiment. The information processing apparatus 1 according to the embodiment is implemented as a notebook personal computer.

Assume that the information processing apparatus 1 is connected to a display apparatus 2 including a loudspeaker, by an HDMI cable 3, as shown in FIG. 1. Further assume that the multi-display method is performed, whereby the liquid crystal display (LCD) incorporated in the information processing apparatus 1 displays a part of an image and the display apparatus 2 connected by the HDMI cable 3 to the apparatus 1 displays the other part of the image.

The user can move any window the application program displays on the screen and change the size of the window as desired, by operating a keyboard or a pointing device. Thus, during the multi-display, the user can have the window displayed at the information processing apparatus 1 or the display apparatus 2, whichever apparatus he or she likes. In addition, the user can move the window from the information processing apparatus 1 to the display apparatus 2, over vice versa. In the case shown in FIG. 1, the LCD incorporated in the information processing apparatus 1 displays a window "a", by using an application program. The user is supposed to keep watching the LCD screen of the information processing apparatus 1 while the LCD is displaying the window "a". It is therefore desired that the loudspeaker incorporated in the information processing apparatus 1 should produce audio.

FIG. 2 shows the case where the display apparatus 2 displays the window "a". The user is supposed to keep watching the screen of the display apparatus 2 while the display apparatus 2 is displaying the window "a". It is therefore desired that the loudspeaker incorporated in the display apparatus 2 should produce audio.

In view of this, the information processing apparatus 1 is configured to appropriately output the audio data to the loudspeaker incorporated in the apparatus 1 or the HDMI connector that connects the display apparatus 2 to the information processing apparatus 1, in accordance with the state of displaying the window "a". This technique will be described below, in detail.

FIG. 3 is an exemplary diagram showing the system configuration of the information processing apparatus 1. As shown in FIG. 3, the information processing apparatus 1 includes a central processing unit (CPU) 11, a memory controller hub (MCH) 12, a main memory 13, a graphics controller 14, a VRAM 14A, an LCD 15, an I/O controller hub (ICH) 16, a Basic Input/Output System (BIOS) read-only memory (ROM) 17, a hard disk drive (HDD) 18, an optical disc drive (ODD) 19, a sound controller 20, a loudspeaker 21, an embedded controller/keyboard controller (EC/KBC) 22, a keyboard 23, a pointing device 24, a network controller 25, an HDMI connector 26, and a Consumer Electronics Control (CEC) device 27.

The CPU 11 is a processor that controls the other components of the information processing apparatus 1, and executes various programs loaded into the main memory 13 from the HDD 18 and ODD 19. Among these programs the CPU 11 may execute are: OS 100 for managing resources, audio control manager (ACM) 150 operating under the control of OS 100, and various application programs 200. The audio control manager 150 is a program that sets the destination of the above-mentioned audio data. Further, the CPU 11 executes the BIOS stored in the BIOS-ROM 17. The BIOS is a program that controls hardware.

The MCH 12 works as a bridge device that connects the CPU 11 and the ICH 16 to each other, and also as a memory controller that controls the access to the main memory 13. The MCH 12 further includes a function of communicating with the graphics controller 14. The graphics controller 14 is a display controller that controls the LCD 15 incorporated in the information processing apparatus 1. The graphics controller 14 produces a video signal from the video data written into the VRAM 14A. The video signal, thus produced, will be supplied to the LCD 15. The graphics controller 14 further includes a function of outputting the video signal to an external apparatus through the HDMI connector 26.

The ICH 16 controls each device on the Peripheral Component Interconnect (PCI) bus, and each device on the Low Pin Count (LPC) bus. Further, the ICH 16 is connected directly to the BIOS-ROM 17, HDD 18, ODD 19 and sound controller 20, and includes a function of controlling these components. The HDD 18 stores, for example, broadcast TV program data and AV content downloaded via the Internet. The ODD 19 incorporates, for example, a Digital Versatile Disc (DVD) storing AV content. The sound controller 20 is an audio source device and configured to produce audio signals from audio data and to output the audio signals to the loudspeaker 21. Further, the audio controller includes a function of outputting audio signals to an external apparatus through the HDMI connector 26.

The EC/KBC 22 is a one-chip micro-processing unit (MPU) including an embedded controller and a keyboard controller, which are integrated together. The embedded controller is configured to control power. The keyboard controller is configured to control the inputting of data as the user operates the keyboard 23 or the pointing device 24. Even while the information processing apparatus 1 remains off, the EC/KBC 22 operates, determining whether the information processing apparatus 1 has been turned on or not. If an event occurs, making it necessary to activate the information processing apparatus 1, the EC/KBC 22 performs a control to activate the information processing apparatus 1. The EC/KBC 22 keeps the supply of power to the CEC controller 27, even while the information processing apparatus 1 remains off.

The network controller 25 is a communication device that performs communication with an external network such as the Internet. The HDMI connector 26 is a terminal, to which the HDMI cable 3 is removably connected. Controlled by the EC/KBC 22, the CEC controller 27 controls data transmit, including the transmission of various control commands through the HDMI connector 26. One of the events the EC/KBC 22 should monitor is the receipt of the power-on command at the CEC controller 27. The communication the CEC controller 27 performs can recognize the functions of the display apparatus 2 connected to the information processing apparatus 1, determining, for example, whether the display apparatus 2 connected by the HDMI cable 3 includes a function of outputting audio data.

The operating principle of the audio output control the audio control manager 150 performs in the information processing apparatus 1 include the above-described system configuration will be explained with reference to FIG. 4.

Figure 4:
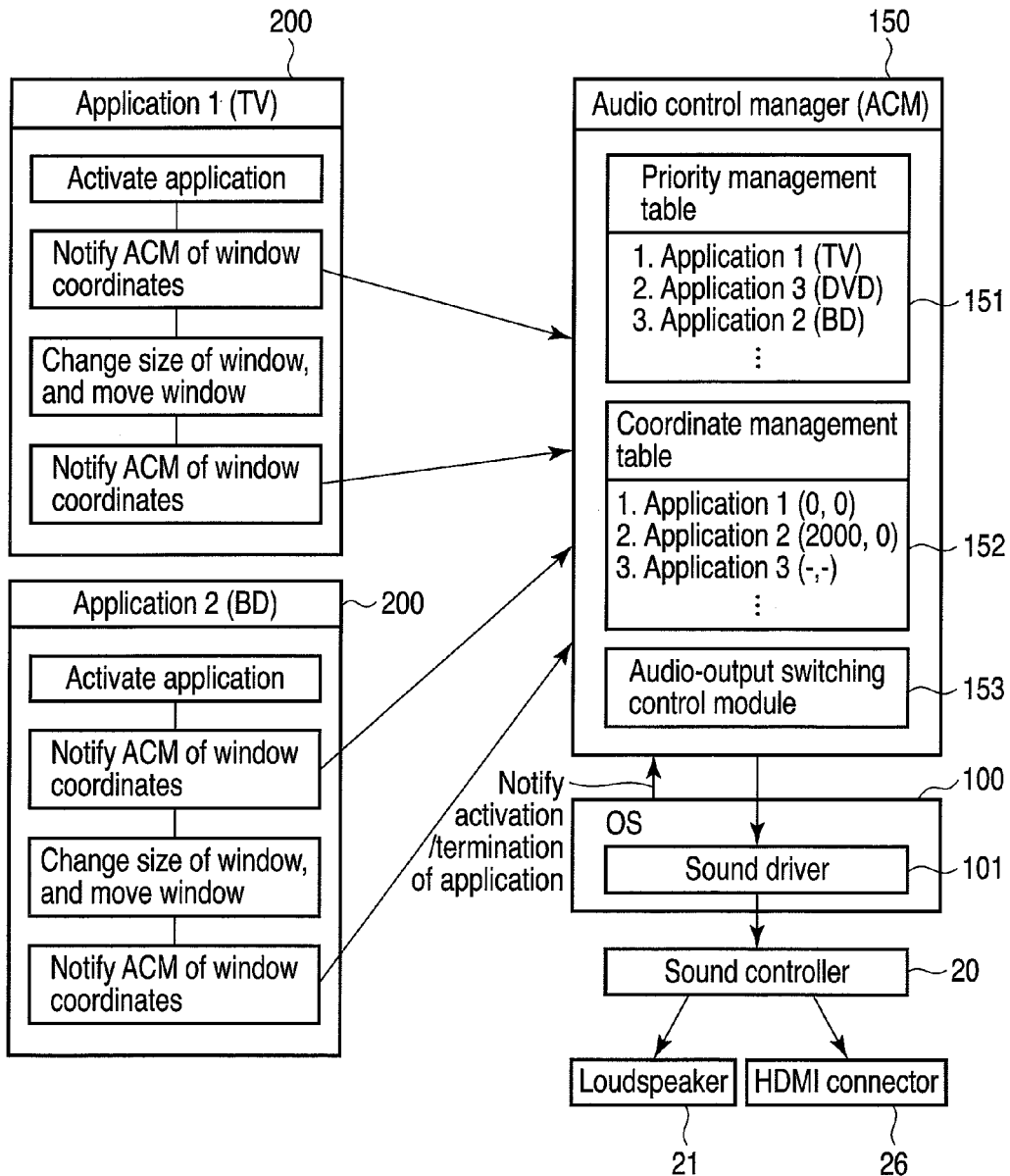
FIG. 4 is an exemplary function block diagram for explaining the operating principle of the audio output control performed by the information processing apparatus according to the embodiment.

As shown in FIG. 4, the audio control manager 150 includes a priority management table 151, a coordinate management table 152, and an audio-output switching control module 153.

The priority management table 151 is a table for managing the priority of an application program that achieves the outputting of audio data. The priority management table 151 includes a user interface function the user may use to set the priority of the application program. The coordinate management table 152 is a table for managing the coordinates of the window displayed by an application program that achieves the outputting of audio data. The audio-output switching control module 153 is a module that sets the loudspeaker 21 or the HDMI connector 26 to which the sound controller 20 should output an audio signal, by using the priority management table 151 and coordinate management table 152.

The audio control manager 150 is incorporated as permanent program in the information processing apparatus 1. When activated, the audio control manager 150 initializes the coordinate management table 152 and requests the OS 100 to transmit an event notification when any application program 200 is activated or terminated. The coordinate management table 152 is initialized by setting the coordinates of the window that the application program managed by the priority management table 151 will display, to values that the coordinates never have in a normal state.

The audio control manager 150 includes two functions. One function is to cause the CEC controller 27 to communicate with the display 2 connected by the HDMI cable 3 to the information processing apparatus 1, thereby to determine whether the display 2 can output audio data. The other function is to determine whether the information processing apparatus 1 is performing the multi-display by cooperating with the OS 100. The audio control manager 150 controls the outputting of audio data in accordance with the window display state, if the display 2 can output audio data while the information processing apparatus 1 is performing the multi-display.

When activated, the application program 200 notifies the coordinates of the window it has displayed, to the audio control manager 150. Further, if the application program 200 changes the window in size or moves the window, it notifies the coordinates of the window thus changed or moved, to audio control manager 150. On receiving the notification, the audio control manager 150 updates the coordinate management table 152, recording the coordinates the window has at present.

Every time the audio-output switching control module 153 receives these notifications, it reads, from the coordinate management table 152, the coordinates of the window to be displayed by the application program, which window has higher priority than any other windows whose effective coordinate values are stored in the coordinate management table 152. Then, the audio-output switching control module 153 determines which device displays the window, the LCD 15 or the display 2. If the LCD 15 displays the window, the audio-output switching control module 153 controls the sound controller 20 via the sound driver 101 of the OS 100, so that the loudspeaker 21 may output the audio signal. If the display 2 displays the window, the audio-output switching control module 153 controls the sound controller 20 via the sound driver 101 of the OS 100, so that the audio signal may be output from the HDMI connector 26.

When notified of an event indicating the termination of the application program 200, the audio-output switching control module 153 of the audio control manager 150 determines whether the application program 200 has priority set by the priority management table 151 (or whether the application program 200 is one for achieving the outputting of audio data). If the application program 200 has priority set by the priority management table 151, the audio-output switching control module 153 updates the coordinate management table 152 in order to initialize the coordinates of the window for the application program.

After updating the coordinate management table 152, the audio-output switching control module 153 performs the same process it did it was notified of the coordinates of the window changed or moved as described above. That is, the audio-output switching control module 153 reads, from the coordinate management table 152, the coordinates of the window to be displayed by the application program (displaying a window), which window has higher priority than any other windows whose effective coordinate values are stored in the coordinate management table 152. Then, the audio-output switching control module 153 determines which device displays the window, the LCD 15 or the display 2. If the LCD 15 displays the window, the audio-output switching control module 153 controls the sound controller 20 via the sound driver 101 of the OS 100, so that the loudspeaker 21 may output the audio signal. If the display 2 displays the window, the audio-output switching control module 153 controls the sound controller 20 via the sound driver 101 of the OS 100, so that the audio signal may be output from the HDMI connector 26.

In the instance of FIG. 4, the application program (Application 1 [TV]) for receiving and displaying that receives broadcast TV programs and the application program (Application 2 [BD]) for playing back the content recorded on a Blu-ray Disc are operating, and the Application 1 (TV) has been set to higher priority than Application 2 (BD). Hence, if Application 1 (TV) and Application 2 (BD) are independently displayed, the audio data will be output from the side where the window of Application 1 (TV) is displayed. If only Application 1 (TV) is terminated in this state, automatic switching will be performed to output the audio data from the side where the window of Application 2 (BD) is displayed. In the case where the window of Application 1 (TV) is moved from one side to the other, the destination of the audio data will be automatically switched.

The audio control manager 150 operates as described above. Thus, in the information processing apparatus 1, the control is achieved to output the audio data at the side that displays the window of the application set to the highest priority and is therefore supposed to be attracting the user's eyes (if the display 2 has the function of outputting audio data, while the information processing apparatus 1 is performing the multi-display).

As described above, the multi-display method displays a part of an image at one apparatus and the other part of the image on the other apparatus. Therefore, the window of the application program set to the highest priority may be displayed, partly by the LCD 15 incorporated in the information processing apparatus 1 and partly by the display 2 connected to the apparatus 1 by the HDMI cable 3. In this case, the audio data may be output, first from the upper-left corner of the widow (defined by the coordinates). Alternatively, the areas of the image parts may be determined from the coordinates and size notified from the application program, and the audio data may be output from the image part of the larger area.

Figure 5:
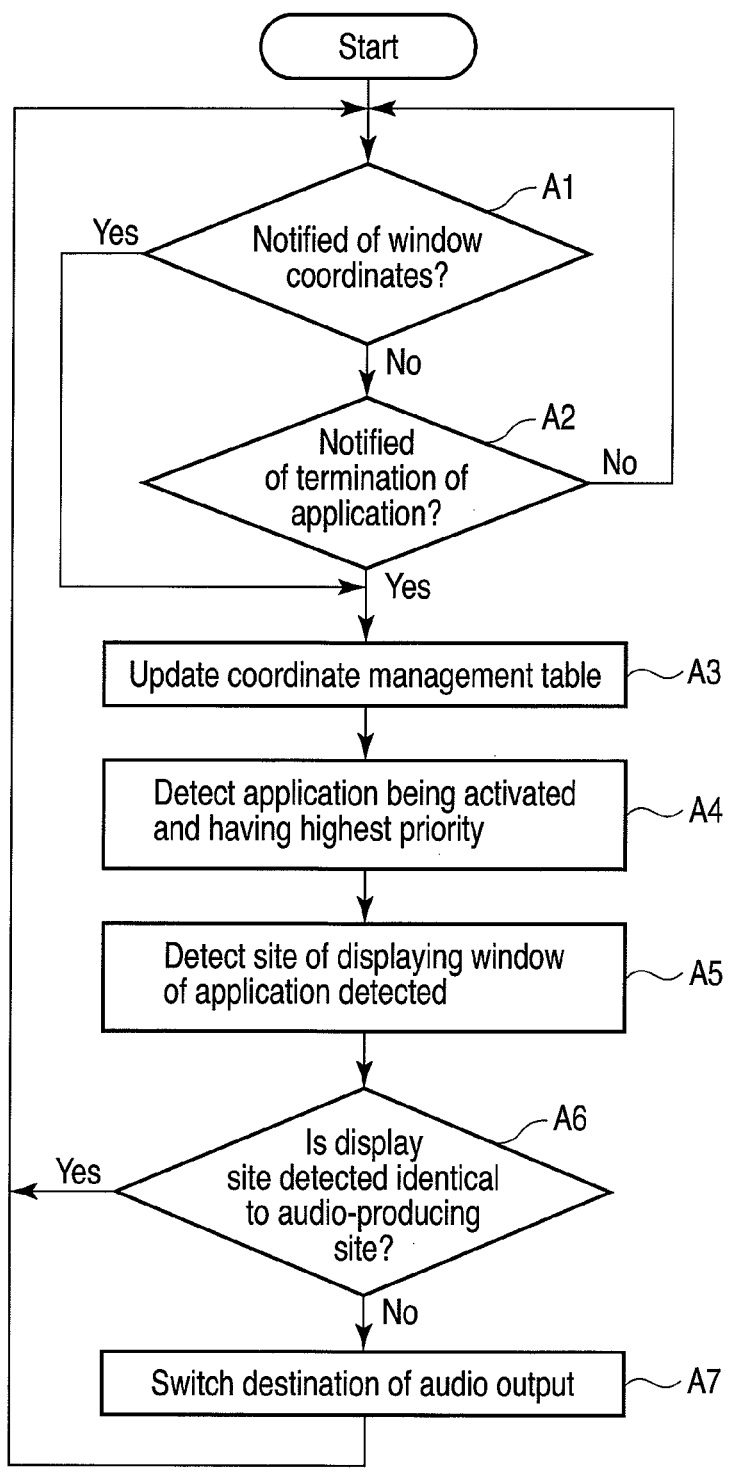
FIG. 5 is an exemplary flowchart showing the sequence of the audio output control performed by the information processing apparatus according to the embodiment.

FIG. 5 is an exemplary flowchart showing the sequence of the audio output control performed by the information processing apparatus 1.

If notified of the coordinates of a window from the application program 200 that achieves the outputting of audio data (YES in Block A1), or if notified of the termination of this application program 200 from the OS 100 (YES in Block A2), the audio control manager 150 first updates the coordinate management table 152 (Block A3).

Then, the audio control manager 150 refers to the coordinate management table 152 thus updated and also to the priority management table 151, thereby detecting the application program 200 set to the highest priority and being executed (Block A4), and detecting the location where the window of the application program 200 detected should be displayed (Block A5).

The audio control manager 150 then determines whether the location where to display the window detected is identical to the location to which the audio data is now being output (Block A6). If these locations are not identical (NO in Block A6), the audio control manager 150 will instruct, via the sound driver 101 of the OS 100, the sound controller 20 to output the audio signal from the location where the window detected is displayed (Block A7).

As has been described, the information processing apparatus 1 can appropriately set the apparatuses to which audio signals should be output during the multi-display.

Since the audio output control process described above can be achieved by a computer program, the computer program is introduced into a computer through a computer-readable storage medium, thereby making it possible to achieving advantageous effect similar to those of the embodiment.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a display;
a speaker;
a connector to output a video signal and an audio signal;
a multi-display controller to control video signal output to display a part of an image at the display and another part of the image at an external apparatus connected to the connector;
a sound driver to control audio signal output at the speaker and the connector; and
an audio-output controller to control the sound driver to switch an output destination of the audio signal from the speaker to the connector when a first window moves from the display to the external apparatus while the information processing apparatus is performing a multi-display,
wherein the audio-output controller controls the sound driver to output the audio signal to the speaker when the first window is displayed partly at the display and partly at the external apparatus and a larger part of the first window is displayed at the display, and to control the sound driver to output the audio signal to the connector when the first window is displayed partly at the display and partly at the external apparatus and the larger part of the first window is displayed at the external apparatus.

2. The apparatus of claim 1, wherein:
the audio-output controller comprises a priority controller to set priorities to application programs; and
the first window is a window displayed by an application program to which the highest priority has been set among application programs displaying windows.

3. The apparatus of claim 1, further comprising a determination controller to determine whether the external apparatus is capable of outputting audio data,
wherein the audio-output controller is controls the sound driver to output the audio signal to the speaker when the external apparatus is not capable of outputting audio data.

4. The apparatus of claim 1, wherein the connector detachably connects a High-Definition Multimedia Interface (HDMI) cable.

5. The apparatus of claim 1, wherein:
the first window is a window displayed by a first application program; and
the audio-output controller controls the sound driver to output the audio signal to the speaker when the display displays the first window, and controls the sound driver to output the audio signal to the connector when the external apparatus displays the first window.

6. A method of controlling audio output on an information processing apparatus comprising a display, a speaker, a connector to output a video signal and an audio signal, a multi-display controller to control video signal output to display a part of an image at the display and another part of the image at an external apparatus connected to the connector, and a sound driver to control audio signal output at the speaker and the connector, the method comprising:
controlling the sound driver to switch an output destination of the audio signal from the speaker to the connector when a first window moves from the display to the external apparatus while the information processing apparatus is performing a multi-display,
wherein the controlling the sound driver comprises controlling the sound driver to output the audio signal to the speaker when the first window is displayed partly at the display and partly at the external apparatus and a larger part of the first window is displayed at the display, and controlling the sound driver to output the audio signal to the connector when the first window is displayed partly at the display and partly at the external apparatus and the larger part of the first window is displayed at the external apparatus.

7. The method of claim 6, wherein:
the controlling the sound driver comprises setting priorities to application programs; and
the first window is a window displayed by an application program to which the highest priority has been set among application programs displaying windows.

8. The method of claim 6, further comprising determining whether the external apparatus is capable of outputting audio data,
wherein the controlling the sound driver further comprises controlling the sound driver to output the audio signal to the speaker when the external apparatus is not capable of outputting audio data.

9. The method of claim 6, wherein the connector detachably connects a High-Definition Multimedia Interface (HDMI) cable.

10. The method of claim 6, wherein:
the first window is a window displayed by a first application program; and
the controlling the sound driver further comprises controlling the sound driver to output the audio signal to the speaker when the display displays the first window, and controlling the sound driver to output the audio signal to the connector when the external apparatus displays the first window.

11. A non-transitory computer-readable storage medium having stored thereon a computer program which is executable by a computer comprising a display, a speaker, a connector to output a video signal and an audio signal, a multi-display controller to control video signal output to display a part of an image at the display and another part of the image at an external apparatus connected to the connector, and a sound driver to control audio signal output at the speaker and the connector, the computer program comprising instructions capable of causing the computer to execute functions of:
controlling the sound driver to switch an output destination of the audio signal from the speaker to the connector when a first window moves from the display to the external apparatus while the computer is performing a multi-display,
wherein the computer program further comprises instructions capable of causing the computer to execute functions of:
controlling the sound driver to output the audio signal to the speaker when the first window is displayed partly at the display and partly at the external apparatus and a larger part of the first window is displayed at the display; and
controlling the sound driver to output the audio signal to the connector when the first window is displayed partly at the display and partly at the external apparatus and the larger part of the first window is displayed at the external apparatus.

12. The medium of claim 11, wherein:
the computer program further comprises instructions capable of causing the computer to execute functions of setting priorities to application programs, and
the first window is a window displayed by an application program to which the highest priority has been set among application programs displaying windows.

13. The medium of claim 11, wherein the computer program further comprises instructions capable of causing the computer to execute functions of:
determining whether the external apparatus is capable of outputting audio data; and
controlling the sound driver to output the audio signal to the speaker when the external apparatus is not capable of outputting audio data.

14. The medium of claim 11, wherein the connector detachably connects a High-Definition Multimedia Interface (HDMI) cable.

15. The medium of claim 11, wherein:
the first window is a window displayed by a first application program, and
the computer program further comprises instructions capable of causing the computer to execute functions of:
controlling the sound driver to output the audio signal to the speaker when the display displays the first window; and
controlling the sound driver to output the audio signal to the connector when the external apparatus displays the first window.

* * * * *